March 24, 1970 HIROSHI ICHIKAWA ET AL 3,502,780
COOLING SYSTEM FOR INDUCTORS IN LOW-FREQUENCY
INDUCTION FURNACE
Filed Nov. 15, 1967 2 Sheets-Sheet 1
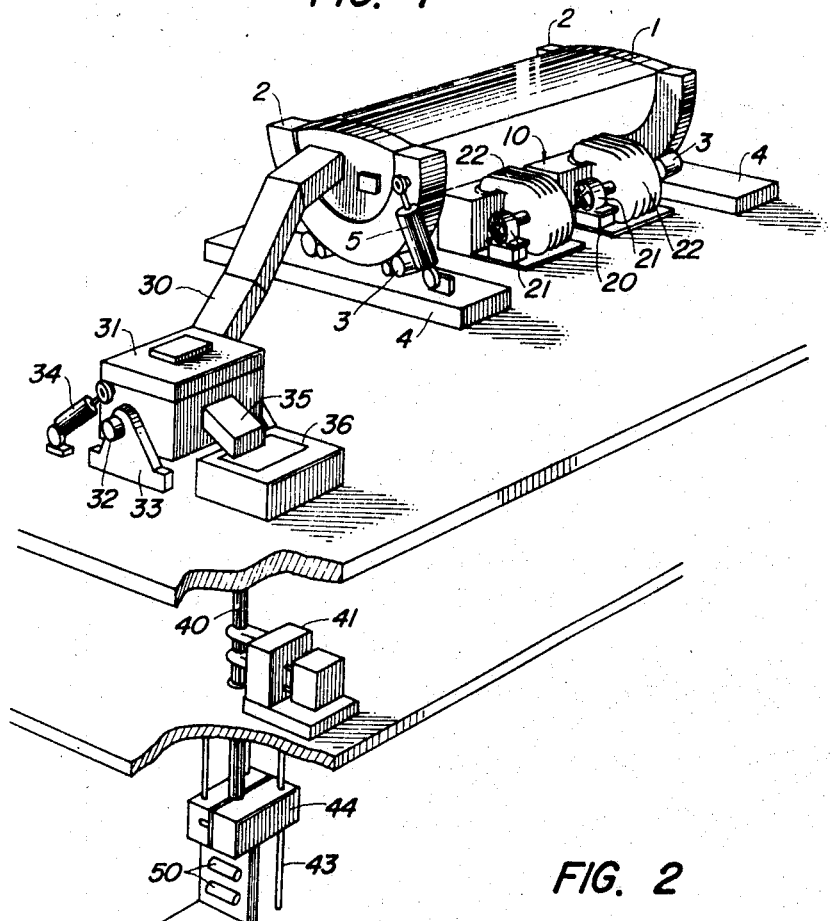
FIG. 1
FIG. 2
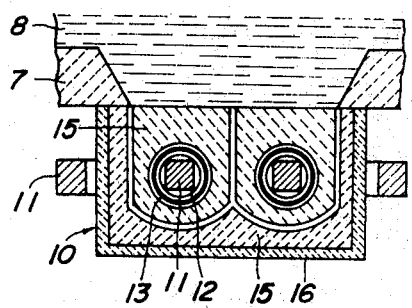
INVENTORS
HIROSHI ICHIKAWA
SHINICHIRO KIYOMIYA
BY Craig & Antonelli
ATTORNEYS

INVENTORS
HIROSHI ICHIKAWA
SHINICHIRO KIYOMIYA

BY *Craig + Antonelli*

ATTORNEYS

3,502,780
COOLING SYSTEM FOR INDUCTORS IN LOW-FREQUENCY INDUCTION FURNACE
Hiroshi Ichikawa, Tsuchiura-shi, and Shinichiro Kiyomiya, Hitachi-shi, Japan, assignors to Hitachi Cable Ltd., Tokyo, Japan, a corporation of Japan
Filed Nov. 15, 1967, Ser. No. 683,286
Claims priority, application Japan, Dec. 28, 1966, 42/448
Int. Cl. H05b 5/14
U.S. Cl. 13—29      1 Claim

ABSTRACT OF THE DISCLOSURE

An inductor cooling system for low-frequency induction furnaces provided with at least one inductor, the system having a plurality of blowers which are installed at a place quite remote from the furnace for the suction of air at low temperatures free from the heat radiated from the furnace. These blowers discharge cool air into a common air supply conduit led to the inductor, and a universal pipe joint is provided in the air supply conduit to permit unobstructed supply of cooling air regardless of any inclination of the tiltable furnace.

Background of the invention

This invention relates to a cooling system for inductors in a low-frequency induction furnace which is preferably used as a melting furnace in a casting apparatus.

It is already known that inductors are useful heating means for use in melting furnaces of casting apparatus for the heating and melting of metals and alloys such as copper, copper alloys, aluminum, aluminum alloys, iron, cast steel and cast iron. The inductors in such a melting furnace are compactly arranged in an extremely narrow space with a view to attaining a high heating efficiency, and must be continuously cooled in order to protect the coils from the heat consumed therein for thereby preventing unusual temperature rise that might occur in the coils. Absence or stoppage of cooling for the inductor inevitably gives rise to a great damage including partial breakage of the inductor and the resultant shutdown of the melting furnace as well as a wasteful loss of time for the repair or replacement of the inductor.

The number of inductors generally varies depending on the size of a furnace, and the inductors are employed in a great number in case of a large-sized melting furnace generally used in a continuous casting apparatus. In the continuous casting apparatus, it is well-known practice to employ the so-called unit cooling system in which one blower is provided for each of the inductors.

For example, a channel type low-frequency induction furnace ordinarily employed in a continuous casting apparatus as shown in FIG. 1 is provided with four inductors 10 which are adapted to operate with a three-phase alternating current with a 1250 kva. rating. The structure and arrangement of the continuous casting apparatus will be briefly described so that the present invention can be more clearly understood. The casting apparatus comprises a channel type furnace whose body 1 is tiltably mounted on support blocks 4 by means of rollers 3 in rolling engagement with flanges 2 extending from the furnace body 1, and a hydraulic cylinder 5 for causing the tilting movement of the channel type furnace body 1. The inductors 10 are mounted on individual base plates 20 on opposite sides of the channel type furnace body 1 in a manner that two inductors 10 are disposed on each side of the furnace body 1. The molten metal is continuously supplied into a melt reserving furnace 31 by way of a melt transfer trough 30. The melt reserving furnace 31 has its trunnions 32 journaled in pedestals 33 so that the furnace 31 can make a tilting movement by the action of a hydraulic cylinder 34. The melt reserved in the reserving furnace 31 is then supplied through a casting trough 35 and a casting block or mold 36 to be continuously cast into an ingot 40, which is transferred past a pair of pinch rolls 41 and is cut by a cutter 44 into ingot products 50 of predetermined dimensions. The cutter 44 is freely movable in a direction of a shaft 43, and the ingot products 50 are transferred in the desired direction by a series of transfer rollers 51.

The structure of an inductor 10 is shown in FIG. 2 by way of example, from which it will be seen that the inductor 10 is firmly fixed to the furnace wall 7 and comprises an iron core 11, a coil 12 wound about each leg of the iron core 11, protective cylinders 13 surrounding the coils 12, a mass of stamping material 15 of sillimanite or the like surrounding the cylinders 13, and an outermost layer of fire bricks 16. The surface of the refractory material or refractories 15 is in contact with molten metal melt 8. Commonly, the coil 12 is electrically insulated by a Class H insulating material which can withstand a maximum temperature of 130° C., and the protective cylinder 13 for each coil 12 is spaced a gap of 85 to 100 millimeters from the mass of refractory material 15. Since the refractory material 15 in contact with the molten metal 8 may be exposed to a high temperature of the order of 1,100 to 1,350° C. in case of copper casting, interruption of cooling air supply to the periphery of the protective cylinder 13 from the blower would unavoidably result in burn of the coil 12.

As will be apparent from FIG. 1, the priorly known cooling arrangement for the inductors 10 comprises a cooling unit consisting of a blower 22 and a driving motor 21 provided for each inductor 10. Further, in view of the specific structure of the channel type furnace, the blower 22 and the driving motor 21 are directly mounted on the common base plate 20 for the inductor 10 so as to deal with any tilting movement of the furnace body 1. In other words, the blower 22 and the driving motor 21 had to be mounted on the common base plate 20 for the inductor 10 so that the blower 22 can satisfactorily make its cooling action regardless of the tilting position of the furnace body 1.

The prior art cooling system as such has given rise to various technical problems. In the first place, the prior cooling system is defective in that the coil 12 cannot be sufficiently cooled since the blower 22 disposed adjacent to the inductor 10 inhales relatively warm air existing around the furnace body 1 and directs such air to the inductor 10 for the cooling thereof. In order therefore to enhance the cooling effect, the blower 22 and the driving motor 21 must have a larger capacity, which is quite uneconomical.

Secondly, the driving motor 21 is liable to be thermally affected by the heat radiated from the furnace regardless of whatever size of the driving motor 21. As a result, the driving motor 21 has a short service life and might be unexpectedly rendered inoperative or develop a burn, which gives rise to burn of the inductor 10, hence shutdown of the furnace.

Thirdly, the prior cooling system comprising one blower 22 for each of a plurality of inductors 10 is defective in that stoppage of any one of the blowers 22 substantially brings forth the shutdown of the furnace.

Summary of the invention

It is therefore the primary object of the present invention to solve the technical problems encountered with the prior art cooling system as described above.

Another object of the present invention is to provide a novel and economical cooling system adapted for use with a furnace having a plurality of inductors so that the cooling of the inductors can be unobstructedly carried out even if failure might occur in one of a plurality of cooling units.

Still another object of the present invention is to provide a cooling system based on a novel concept which can sufficiently deal with any rotary tilting movement of a melting furnace or a furnace of other type and which can operate entirely free from the effect of warm air existing around the furnace.

A further object of the present invention is to provide an economical cooling system suitable for the effective cooling of inductors used in a melting furnace or other furnace forming part of an apparatus such as a continuous casting apparatus which is continuously operated for an extended period of time.

The above and other objects, advantages and features of the present invention will become apparent from the following description with reference to the accompanying drawings:

Brief description of the drawings

FIG. 1 is a schematic perspective view of a casting apparatus employing a low-frequency induction furnace therein, the furnace being shown as operatively associated with a prior cooling system for the inductors therein as described previously.

FIG. 2 is a schematic sectional view of one of the inductors in FIG. 1.

Description of the preferred embodiments

Figure 3:
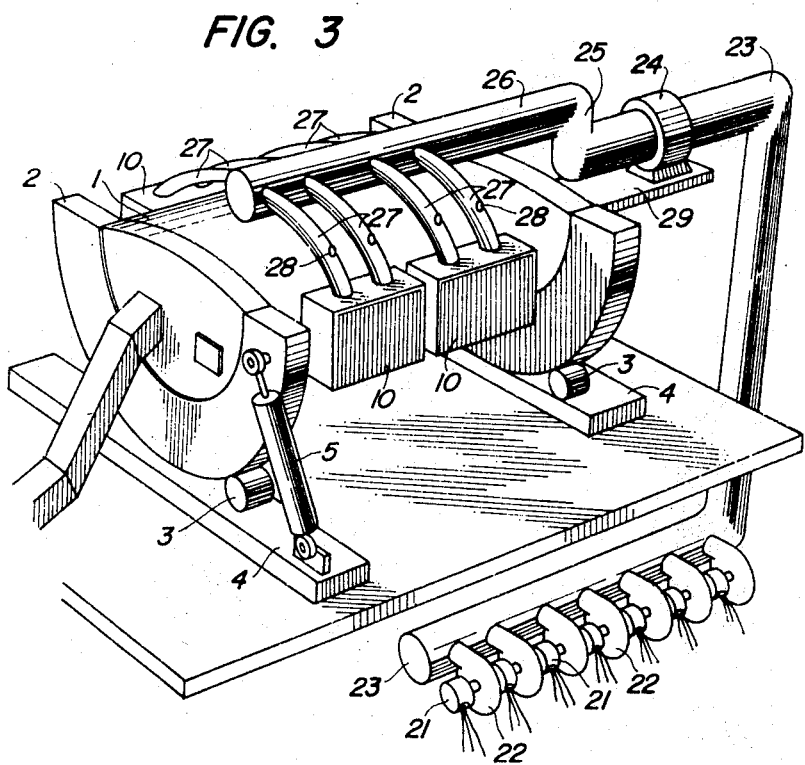
FIG. 3 is a schematic perspective view showing a preferred embodiment of the cooling system according to the present invention.

In accordance with one aspect of the invention, there is provided an inductor cooling system for an induction furnace provided with at least one inductor, characterized by the provision of a plurality of blowers disposed at a position which is free from the influence of warm air surrounding said furnace and said inductor, and a common air supply pipe connected to said blowers for cooling air supply to said inductor.

In accordance with another aspect of the present invention, there is provided an inductor cooling system for a tiltable low-frequency induction furnace provided with at least one inductor, characterized by the provision of a plurality of blowers, a common air supply pipe for transporting cooling air supplied from said blowers, and a universal pipe joint interposed in said common air supply pipe so as to ensure unobstructed air supply to said inductor regardless of tilting movement of the furnace.

In accordance with another aspect of the present invention, there is provided an inductor cooling system for a tiltable low-frequency induction furnace provided with a plurality of inductors, characterized by the provision of a plurality of blowers, a common air supply pipe for transporting cooling air supplied from said blowers, a universal pipe joint interposed in said common air supply pipe, and a plurality of branch pipes, at least one for each inductor, connected to said common air supply pipe for supplying cooling air to said inductors, whereby cooling air can be unobstructedly supplied to said inductors regardless of tilting movement of the furnace.

In other words, the subject matter of the present invention resides in the novel arrangement that, in a tiltable low-frequency induction furnace provided with one or more inductors, at least two cooling units each including a blower and a driving motor are connected to each of the inductors through a common air supply pipe and a universal pipe joint interposed in the air supply pipe.

The term "inductor" referred to hereinbefore is intended to designate an inductor of structure which requires cooling as, for example, that shown in FIG. 2, but its practical structure is in no way limited to the one shown in FIG. 2.

Further, the term "tiltable furnace" referred to hereinbefore is intended to designate a melting furnace or a reserving furnace which can temporarily reserve molten metal as shown in FIG. 1, but its practical structure is in no way limited to the one shown in FIG. 1.

The terms "air supply pipe" and "branch pipe" referred to in the present invention are intended to designate and air conduit which can positively supply cooling air to the desired inductor from the blowers.

The air supply pipe and the branch pipe may be a tubular member of circular, elliptical, square, rectangular or other cross section consisting singly of or of a suitable combination of metallic material, concrete, brick, glass and other material.

The term "universal pipe joint" referred to in the present invention is intended to designate a rotatable, expansible, flexible or other movable pipe joint which is interposed in the air supply pipe so that the air supply pipe extending between the blowers and the tiltable furnace may not be damaged by the tilting movement of the tiltable furnace. The universal pipe joint may preferably be of a rotary type of pipe joint disposed on the extension of the axis of the furnace in case the furnace is adapted to rotate about a fixed axis, and may preferably be of a flexible type of pipe joint such as a flexible metal pipe in case the furnace makes irregular tilting movement.

Further, the term "blower" referred to in the present invention is intended to designate a blower of fan type, pump type or any other type, and the term "motor" is intended to designate any kind of motor such as an electric motor or internal combustion engine. In connection with the above, the term "at least two cooling units" is used to designate two blowers each connected to a driving motor and does not intend to include more than two blowers connected to a single driving motor.

A preferred embodiment of the present invention will now be described in detail with reference to FIGS. 3 and 4 in which like reference numerals are used to denote like parts appearing in FIG. 1.

Referring to FIG. 3, there is shown a channel type low-frequency induction furnace whose body 1 is provided with four 1,250-kva. inductors 10 adapted to operate with a three-phase alternating current. The furnace body 1 is tiltably mounted on support blocks 4 by means of rollers 3 in rolling engagement with flanges 2 extending from the furnace body 1, and a hydraulic cylinder 5 is operatively associated with the furnace body 1 to cause predetermined tilting movement of the latter. A pair of branch pipes 27 for cooling air supply are connected to each inductor 10, and all the branch pipes 27 are connected to a common air supply pipe 26 disposed above the furnace body 1 in parallel to the axis of the latter. Eight cooling units each consisting of a driving motor 21 and a blower 22 are disposed at a place which is sufficiently remote from the furnace body 1 and hence is entirely free from the influence of heat radiated from the furnace. These blowers 22 are connected to a main air supply pipe 23, one end of which is disposed to lie on the extension of the rotary axis of the furnace body 1 and is connected to the air supply pipe 26 through a rotary pipe joint 24 and an elbow 25. The rotary pipe joint 24 is fixedly mounted on a support block 29. An air flow regulating lever 28 is provided midway of each branch pipe 27 in order to regulate the flow of cooling air passing through the branch pipe 27.

The pipes 23, 26 and 27, the elbow 25 and the rotary pipe joint 24 in the present embodiment are of steel plate construction, and the pipes 23 and 26 are constructed to have a diameter of about 800 millimeters, while the pipes 27 are constructed to have a diameter of about 240 millimeters. The blowers 22 in the present embodiment are designed to operate with a static pressure of 400 mm. Hg, wind delivery of about 55 cubic meters per minute and capacity of 7.5 kilowatts, It will be appreciated that cooling air supply from the main air supply pipe 23 to the air supply pipe 26 can be continuously and unobstructedly made independently of the tilting movement of the furnace body 1 by the hydraulic cylinder 5 since the elbow 25 connected at one end to the air supply pipe 26 is connected at the other end to the rotary pipe joint 24 disposed to lie on the extension of the rotary axis of the furnace body 1. Disposition of the cooling units at a place sufficiently remote from the furnace body 1 and the inductors 10 in accordance with the cooling system of the invention exhibits a marked effect in that the blowers 22 do not inhale hot air having cooled the inductors 10 and can constantly supply cool air to the inductors 10 to sufficiently cool down the same. Therefore, the prior trouble resulting from recirculation of hot air having cooled the inductor coils and supply of air at a relatively high temperature existing in the vicinity of the furnace body 1 can be completely obviated. Another notable effect derivable from the invention is that the vibration due to rotation of the blowers 22 and the driving motors 21 is not transmitted to the furnace body 1 and the inductors 10 by virtue of the disposition of the cooling units on the floor remote from the furnace body 1.

Provision of a plurality of cooling units (eight units in the present embodiment) consisting of the blowers 22 and the driving motors 21 is advantageous in that failure of any one of the cooling units does not in any way affect the desired cooling of the inductors 10 and therefore inoperativeness of the inductors 10 due to burn of the coils cannot utterly take place.

An experiment made on the cooling system described above proved that any burn of the coils of the inductors 10 could not occur even though three units out of the eight cooling units were rendered inoperative. It will be understood from the above experimental result that the cooling operation can be unobstructedly performed if the number of cooling units under failure is up to three, and any shutdown of the furnace due to burn of the inductors cannot utterly take place by successively repairing the cooling units which have been rendered inoperative. It is another advantage of the present invention that the blowers serving as supply air intake means can be freely disposed at any place sufficiently remote from the inductors and the furnace body.

The present invention is so effective that failure in the cooling units (which has generally occurred every eight months in the prior arrangement) can be substantially eliminated so that the furnace can be continuously run for an extended period of twenty-four months without any shutdown, and the failure in the blowers and associated equipment cannot be entirely encountered.

Figure 4:
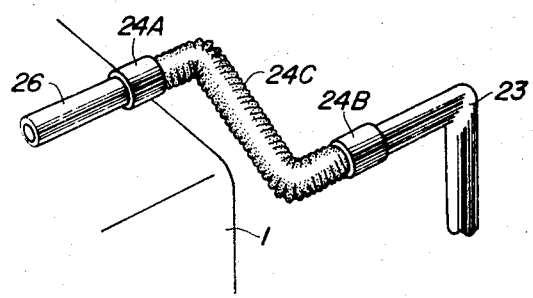
FIG. 4 is a schematic perspective view showing a modified form of a joint in the cooling system shown in FIG. 3.

In FIG. 4 there is shown a modified form of the pipe joint connecting the pipe 23 to the pipe 26. In FIG. 4, a flexible pipe 24C having connections 24A and 24B is connected between the pipes 23 and 26 to deal with any tilting movement of the furnace body 1.

It will be appreciated that the present invention provides an inductor cooling system which endures operation for a long period of time without any failure and can be easily repaired in the event of failure without in any way impairing the cooling effect for the inductors. It is to be understood that the present invention is not only applicable to inductors of common induction furnaces but also applicable to inductors of rotary type and tiltable type of furnaces.

We claim:
1. An inductor cooling system for a tiltable induction furnace provided with a plurality of inductors, characterized by the provision of a plurality of blowers, a common air supply pipe for transporting cooling air supplied from said blowers, a universal pipe joint interposed in said common air supply pipe, and a plurality of branch pipes, at least one for each inductor, connected to said common air supply pipe for supplying cooling air to said inductors, whereby cooling air can be unobstructedly supplied to said inductors regardless of tilting movement of the furnace.

References Cited
UNITED STATES PATENTS

| | | | |
|---|---|---|---|
| 1,069,923 | 8/1913 | Crafts | 13—29 |
| 1,640,826 | 8/1927 | Foley | 13—29 |

JOSEPH V. TRUHE, Primary Examiner

L. H. BENDER, Assistant Examiner

U.S. Cl. X.R.

13—26